United States Patent
Berrajaa et al.

(10) Patent No.: US 9,530,319 B2
(45) Date of Patent: Dec. 27, 2016

(54) METHOD AND DEVICE FOR DETERMINING AN OPERATIONAL DISTANCE OF AN UNSPECIFIED TERMINATION SEGMENT OF AN AIRCRAFT FLIGHT PLAN

(71) Applicant: Airbus Operations SAS, Toulouse (FR)

(72) Inventors: Jaouad Berrajaa, Plaisance du Touch (FR); Virginie Le Gall, Tournefeuille (FR)

(73) Assignee: Airbus Operations SAS (FR)

( * ) Notice: Subject to any disclaimer, the term of this patent is extended or adjusted under 35 U.S.C. 154(b) by 0 days.

(21) Appl. No.: 14/808,362

(22) Filed: Jul. 24, 2015

(65) Prior Publication Data

US 2016/0027309 A1   Jan. 28, 2016

(30) Foreign Application Priority Data

Jul. 28, 2014 (FR) .................. 14 57257

(51) Int. Cl.
*G01C 21/30* (2006.01)
*G08G 5/00* (2006.01)
(Continued)

(52) U.S. Cl.
CPC .............. *G08G 5/003* (2013.01); *G01C 21/00* (2013.01); *G01C 21/20* (2013.01); *G05D 1/0202* (2013.01); *G08G 5/0039* (2013.01); *G01C 23/00* (2013.01)

(58) Field of Classification Search
USPC .......... 701/25, 527, 3, 11, 411, 15, 52, 26, 16,701/18, 533, 436–438; 348/116–117; 340/970, 340/967
See application file for complete search history.

(56) References Cited

U.S. PATENT DOCUMENTS 7,308,342 B2 * 12/2007 Greenfeld .............. G01C 11/02
                                                          701/3
8,090,526 B2 *  1/2012 Marty .................... G01C 21/00
                                                          701/3
(Continued)

FOREIGN PATENT DOCUMENTS

EP      2333743 A2 *  6/2011 ........... G08G 5/0013
FR      2915304 A1 * 10/2008 ........... G08G 5/0039
(Continued)

OTHER PUBLICATIONS

Analysis of flight management system predictions of idle-thrust descents; Laurel Stell; Digital Avionics Systems Conference (DASC), 2010 IEEE/AIAA 29th; Year: 2010; pp. 1.E.2-1-1.E.2-13, DOI: 10.1109/DASC.2010.5655506.*

(Continued)

*Primary Examiner* — Cuong H Nguyen
(74) *Attorney, Agent, or Firm* — Lerner, David, Littenberg, Krumholz & Mentlik, LLP

(57) ABSTRACT

The device includes a receiving unit for receiving at least a start point of an unspecified termination segment, an orientation of the unspecified termination segment and a start point of a following segment, a first computation unit for calculating a median plane passing through the start point of the following segment and perpendicular to this following segment, a second computation unit for calculating an operational distance, called calculated operational distance, as a function of the position of the start point of the unspecified termination segment relative to the median plane, using geometric data, and a transmission unit for providing at least one user means with the calculated operational distance.

10 Claims, 3 Drawing Sheets

(51) Int. Cl.
  *G01C 21/20* (2006.01)
  *G01C 21/00* (2006.01)
  *G05D 1/02* (2006.01)
  *G01C 23/00* (2006.01)

(56) References Cited

U.S. PATENT DOCUMENTS

| | | | | |
|---|---|---|---|---|
| 8,099,234 B1* | 1/2012 | Frank | ............... | G01C 23/005 701/436 |
| 8,126,599 B2* | 2/2012 | Coulmeau | ............ | G08G 5/0039 340/961 |
| 8,392,038 B2* | 3/2013 | Caillaud | ............... | G01C 21/00 244/118.5 |
| 8,498,769 B2* | 7/2013 | Sacle | ............... | G01C 21/00 701/11 |
| 2005/0137758 A1* | 6/2005 | He | ............... | G01C 23/005 701/3 |
| 2008/0262665 A1* | 10/2008 | Coulmeau | ............ | G08G 5/0039 701/16 |
| 2009/0248297 A1* | 10/2009 | Feyersisen | ............ | G01C 21/00 701/467 |
| 2010/0168936 A1* | 7/2010 | Caillaud | ............... | G01C 21/00 701/5 |
| 2015/0298821 A1* | 10/2015 | Ishihara | ............... | B64D 45/04 701/18 |

FOREIGN PATENT DOCUMENTS

| | | | | |
|---|---|---|---|---|
| FR | 2953627 A1 * | 6/2011 | ............ | G05D 1/0676 |
| FR | 2968818 A1 * | 6/2012 | ............ | G08G 5/0021 |

OTHER PUBLICATIONS

The Global In-Flight Internet; E. Sakhaee; A. Jamalipour; IEEE Journal on Selected Areas in Communications; Year: 2006, vol. 24, Issue: 9; pp. 1748-1757, DOI: 10.1109/JSAC.2006.875122.*

UAS behavior modeling based on high level abstraction; Sonia P. Mansilla; Joshua Tristancho; Digital Avionics Systems; Conference (DASC), 2011 IEEE/AIAA 30th; Year: 2011; pp. 5C6-1-5C6-7, DOI: 10.1109/DASC.2011.6096085.*

A systems engineering approach to behavioral predictions of an advanced air traffic management concept; B. F. Gore; K. M. Corker; Digital Avionics Systems Conference, 2000. Proceedings. DASC. The 19th; Year: 2000, vol. 1; pp. 4B3/1-4B3/8 vol. 1, DOI: 10.1109/DASC.2000.886949.*

An improved algorithm for k-nearest-neighbor finding and surface normals estimation; Can Zhao; Xianglin Meng; Tsinghua Science and Technology; Year: 2009, vol. 14, Issue: S1; pp. 77-81, DOI: 10.1016/S1007-0214(09)70071-9.*

Unmanned aerial vehicles routing problem; Dušan Teichmann; Michel Dorda; Jakub Vitek; Vladimir Smrž; Vladimir Michalik Control Conference (ICCC), 2014 15th International Carpathian; Year: 2014; pp. 602-607, DOI: 10.1109/CarpathianCC.2014.6843676.*

GPS/INS integrated urban navigation system based on vehicle motion detection; Kaijing Wang; Long Zhao; Guidance, Navigation and Control Conference (CGNCC), 2014 IEEE Chinese; Year: 2014; pp. 667-670, DOI: 10.1109/CGNCC.2014.7007294.*

Derivation and evaluation of improved tracking filter for use in dense multitarget environments; R. Singer; R. Sea; K. Housewright IEEE Transactions on Information Theory; Year: 1974, vol. 20, Issue: 4; pp. 423-432, DOI: 10.1109/TIT.1974.1055256.*

* cited by examiner

METHOD AND DEVICE FOR DETERMINING AN OPERATIONAL DISTANCE OF AN UNSPECIFIED TERMINATION SEGMENT OF AN AIRCRAFT FLIGHT PLAN

The present invention relates to a method and a device for determining an operational distance of an unspecified termination segment of a flight plan of an aircraft, in particular of a transport aircraft.

BACKGROUND OF THE INVENTION

It is known that the construction, by a flight management system of the FMS (Flight Management System) type of an aircraft, of departure or arrival procedures at airports necessitates, in particular cases, the definition of unspecified termination segments. Such an unspecified termination segment is principally used for air to traffic control requirements.

When a procedure containing an unspecified termination segment is defined in the flight management system during the definition of a flight plan, this segment is linked to the other segments by defining a discontinuity between its start and the start of the following segment.

In the context of the present invention, "following segment" is understood to mean the first segment of the flight plan which follows the unspecified termination segment in the direction of flight along the flight plan.

Consequently, for an unspecified termination segment, the start point of and the end point, namely the start of the following segment, of this segment are known, but not its geometric evolution between these two points.

For an arrival procedure for example, aircraft arriving at the start of the unspecified termination segment will fly according to a particular heading or a particular route. The air traffic control services, as a function of the positions of other aircraft, will then guide them according to successive headings until they reach the following segment.

After the definition of a flight plan, the flight management system of an aircraft can calculate elements of prediction to destination such as the distance to destination, the fuel necessary, the descent profile, . . . In order to calculate these prediction elements, when the flight plan contains an unspecified termination segment, an assumption must be made regarding the distance flown for this segment.

BRIEF SUMMARY OF THE INVENTION

Generally, the usual flight management system makes a minimalist assumption close to the direct distance between the start of the unspecified termination segment and the start of the following segment.

This minimalist assumption can generate, according to the geometries of the procedures, calculated distances very different from the distances that are flown operationally. This non-operational assumption can notably have a significant impact on the calculation of the prediction elements.

The purpose of the present invention is to overcome this disadvantage. It relates to a method for determining an operational distance of at least one unspecified termination segment of a flight plan of an aircraft.

According to the invention, the method comprises steps consisting of automatically:

a) receiving at least the following geometric data:
   a start point of the unspecified termination segment;
   an orientation of the unspecified termination segment; and
   a start point of a segment called following segment, the following segment being the first segment of the flight plan following the unspecified termination segment in the direction of flight along the flight plan;

b) calculating a median plane passing through the start point of the following segment and perpendicular to this following segment;

c) calculating an operational distance, called calculated operational distance, as a function of the position of the start point of the unspecified termination segment relative to the median plane, using geometric data; and d) providing at least one user means with the calculated operational distance.

Thus, thanks to the invention, for an unspecified termination segment there is calculated, using real geometric data, a distance called operational distance which is closer to the distance actually flown by the aircraft than a simple direct distance, as described below, which makes it possible to calculate more accurate prediction to destination elements and to overcome the abovementioned disadvantage.

In a preferred embodiment, step c) comprises the sub-steps consisting of:
   determining the extension of the following segment beyond the median plane;
   determining the extension of the unspecified termination segment starting from the start point of the unspecified termination segment, according to said orientation of the unspecified termination segment; and
   calculating the operational distance as a function of the position of the extension of the unspecified termination segment relative to the extension of the following segment and to the median plane.

Moreover, in a particular embodiment, the method is such that:
   it comprises an additional step consisting of checking if the following two conditions C1 and C2 are met:
   C1/ the start point of the unspecified termination segment is situated, relative to the median plane calculated in step b) and defining two half-planes, in the same half-plane as said following segment, and
   C2/ the extension of the unspecified termination segment intersects the extension of the following segment, as well as the median plane, at a point of intersection;
   if the two conditions C1 and C2 are met simultaneously, step c) of the method comprises a sub-step consisting of calculating the operational distance as the sum of a first distance between the start point of the unspecified termination segment and said point of intersection and a second distance between said point of intersection and the start point of the following segment; and
   if the condition C1 is met and the condition C2 is not met, step c) comprises a sub-step consisting of calculating the operational distance as being the sum of a first distance between the start point of the unspecified termination segment and the orthogonal projection of the start point of the unspecified termination segment on the median plane and a second distance between said orthogonal projection and the start point of the following segment.

Moreover, advantageously, the method is such that:
it comprises an additional step consisting of checking if the following two conditions C3 and C4 are met:

C3/ the start point of the unspecified termination segment is situated in the half-plane other than the one in which the following segment is situated, relative to the median plane, and C4/ the extension of the unspecified termination segment intersects the median plane calculated in step b) and defining two half-planes, as well as the extension of the following segment at a point of intersection;

if the two conditions C3 and C4 are simultaneously met, step c) comprises a sub-step consisting of calculating the operational distance as being the sum of a first distance between the start point of the unspecified termination segment and the point of intersection and a second distance between said point of intersection and the start point of the following segment; and if the condition C3 is met and the condition C4 is not met, step c) comprises a sub-step consisting of calculating the operational distance as being the sum of a first distance between the start point of the unspecified termination segment and the orthogonal projection of the start point of the unspecified termination segment on the extension of the following segment and a second distance between said orthogonal projection and the start point of the following segment.

Moreover, advantageously, the method comprises steps subsequent to step c) and consisting of:

allowing a member of the crew of the aircraft to enter an operational distance called new operational distance for the purpose of a replacement;

automatically checking if the following condition C5 is met: said new operational distance is greater than a direct distance between the start point of the unspecified termination segment and the start point of the following segment;

if the condition C5 is met, the method comprises a step consisting of automatically replacing the calculated operational distance by said new operational distance; and if the condition C5 is not met, the method comprises a step consisting of automatically rejecting the proposed replacement and of retaining the calculated operational distance.

Moreover, in a particular embodiment, the method comprises steps subsequent to step c) and consisting of:

allowing a member of the crew of the aircraft to delete the calculated operational distance; and replacing the calculated operational distance by a new operational distance corresponding to a direct distance between the start point of the unspecified termination segment and the start point of the following segment, when a member of the crew of the aircraft deletes the calculated operational distance.

Moreover, advantageously, the method comprises an additional step consisting of displaying a new operational distance, in a way differentiated from a display of said calculated operational distance, on a screen in the cockpit of the aircraft.

The present invention also relates to a device for determining an operational distance of an unspecified termination segment of a flight plan of an aircraft.

According to the invention, said device comprises:

a receiving unit configured to receive at least the following geometric data:
    a start point of the unspecified termination segment;
    an orientation of the unspecified termination segment; and
    a start point of a segment called following segment, the following segment being the first segment of the flight plan which follows the unspecified termination segment in the direction of flight along the flight plan;

a first computation unit configured to calculate a median plane passing through the start point of the following segment and perpendicular to this following segment;

a second computation unit configured to calculate, using geometric data, an operational distance, called calculated operational distance, as a function of the position of the start point of the unspecified termination segment relative to the median plane; and a transmission unit configured to supply at least one user means with the calculated operational distance.

The present invention furthermore relates to a flight management system comprising a device for determining an operational distance of at least one unspecified termination segment of a flight plan, such as defined above.

According to one embodiment, the system is configured to use the calculated operational distance of the unspecified termination segment in order to calculate at least one of the following parameters:

a vertical descent and approach profile;

at least one prediction along the flight plan.

According to a variant embodiment, said system is configured to take into account a new operational distance during a replacement of the operational distance of the unspecified termination segment by the new operational distance and to recalculate at least one calculation of at least one of said parameters using said new operational distance.

The present invention also relates to an aircraft, in particular a transport aircraft, which comprises a device and/or a system such as those mentioned above.

BRIEF DESCRIPTION OF THE DRAWINGS

The appended figures will give a good understanding of how the invention may be embodied. In these figures, identical references denote similar elements.

DETAILED DESCRIPTION

Figure 1:
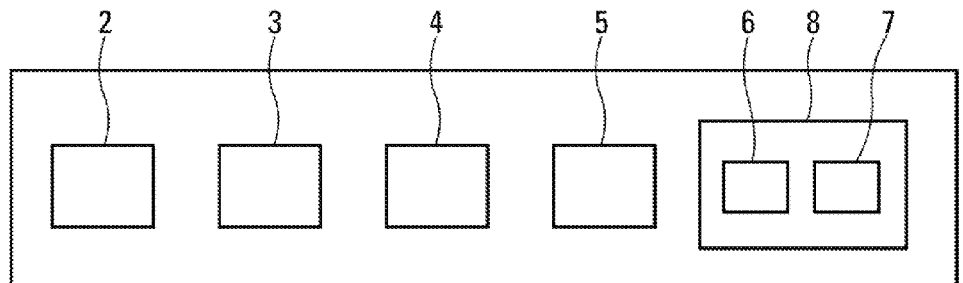
FIG. 1 is a block diagram of a device for determining an operational distance of an unspecified termination segment of a flight plan of an aircraft, making it possible to illustrate the invention.

The device 1 shown diagrammatically in FIG. 1 and making it possible to illustrate the invention is installed in an aircraft AC (FIG. 4), in particular a transport aircraft, and is intended for determining an operational distance of an unspecified termination segment of a flight plan of the aircraft AC.

An unspecified termination segment is a segment of the flight plan, which is unspecified and which is situated between an end point P1 of a first segment S1 of the flight plan and a start point P2 of a second segment S2. The first segment S1, called preceding segment S1, is therefore a segment which precedes the unspecified termination segment in the direction of flight E along the flight plan. The second segment S2, called following segment S2, is a segment which follows the unspecified termination segment in the direction of flight E along the flight plan. In the example shown in FIG. 4 notably, the following segment S2 corresponds to the last segment during an approach for the purpose of a landing on a runway AT of an airport.

In the context of the present invention, the following segment S2 can be a segment other than the last segment of an approach. It can notably be any segment of an approach, or a segment of a type of procedure other than an approach, such as for example a segment of a departure procedure.

Figure 4:
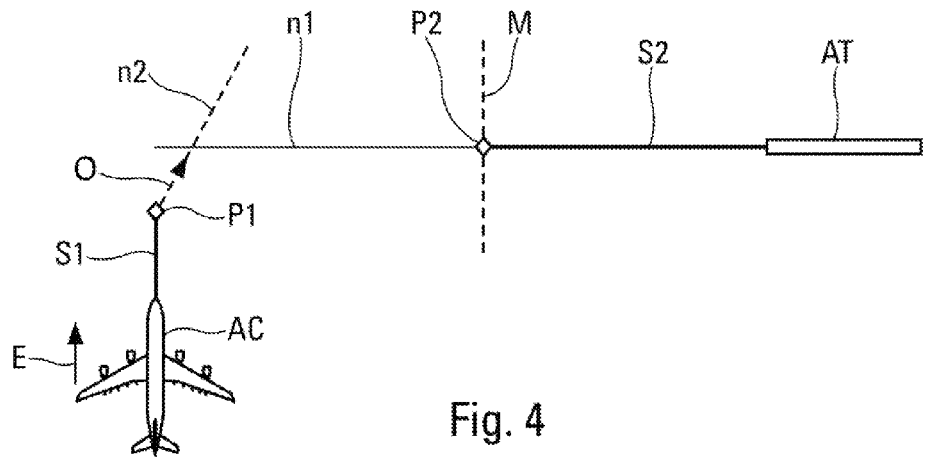
FIG. 4 is a diagrammatic view showing the geometric data received by the device shown in the FIG. 1.

The device 1 comprises a receiving unit 2 configured to receive at least the following geometric data, shown in FIG. 4:
the end point P1 of the segment S1, corresponding to the start point P1 of the unspecified termination segment;
an orientation O (generally a heading or a route) of the unspecified termination segment; and
the start point P2 of the following segment S2, corresponding to the end point P2 of the unspecified termination segment in the direction of flight E along the flight plan.

These data are for example provided to the receiving unit 2 by a flight management system, such as the one described below with reference to FIG. 3.

The device 1 comprises a computation unit 3 configured for calculating a median plane M passing through the start point P2 of the following segment S2 and perpendicular to this following segment S2.

Figure 2:
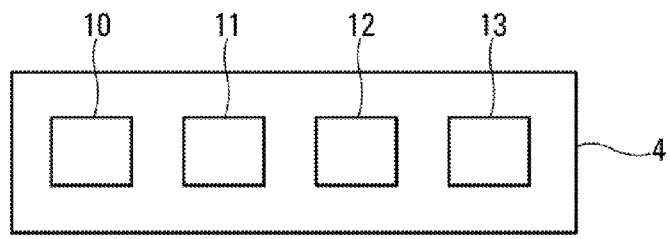
FIG. 2 is a block diagram of a computation unit of the device shown in FIG. 1.

According to the invention, the device 1 furthermore comprises a computation unit 4 which is configured to calculate an operational distance, called calculated operational distance, as a function of the position of the start point P1 of the unspecified termination segment relative to the median plane M, using geometric data, and notably the orientation O, as described below. In order to do this, the computation unit 4 comprises, as shown in FIG. 2, a calculating element 10 which calculates the operational distance.

The device 1 also comprises a transmission unit 5 configured to provide the calculated operational distance to at least one user means, and notably to a flight management system or to any other system on board the aircraft which is likely to use such an operational distance of an unspecified termination segment of a flight plan.

The device 1 furthermore comprises:
a display unit 6 configured to display and provide information to the crew; and
a data acquisition (or input) unit 7, such as a keyboard or touchpad, which is configured to allow the crew to enter data in the device 1, as described below.

In a particular embodiment, the display unit 6 and the data input unit 7 form part of a man/machine interface 8 of the device 1.

As shown in FIG. 2, the computation unit 4 comprises a computation element 11 which determines the extension n1 of the following segment S2 beyond the median plane M.

The computation unit 4 also comprises a computation element 12 which determines the extension n2 of the unspecified termination segment in the direction of flight, taking as its start point the start point P1 of the unspecified termination segment and, as its orientation, the orientation O of the unspecified termination segment.

The computation element 10 of the computation unit 4 calculates the operational distance as a function of the position of the extension n2 of the unspecified termination segment relative, on the one hand, to the extension n1 of the following segment S2 and, the other hand, to the median plane M.

Figure 7:
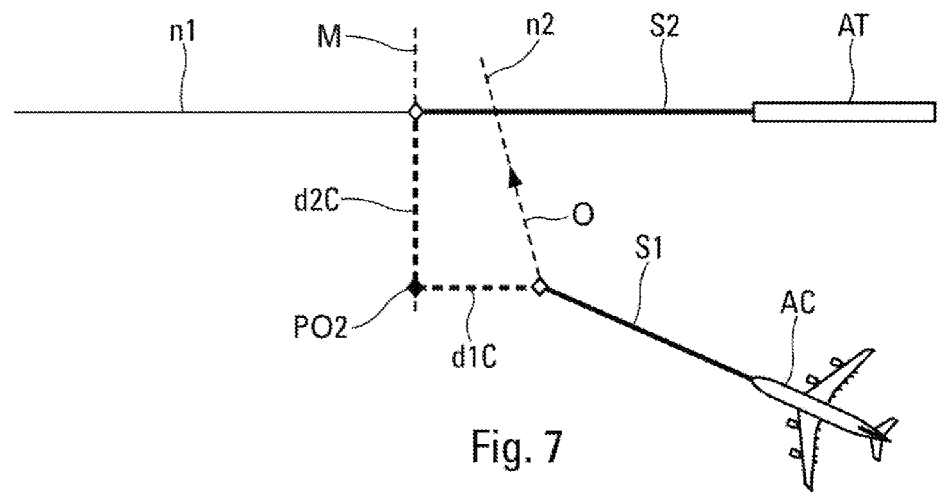
Figure 8:
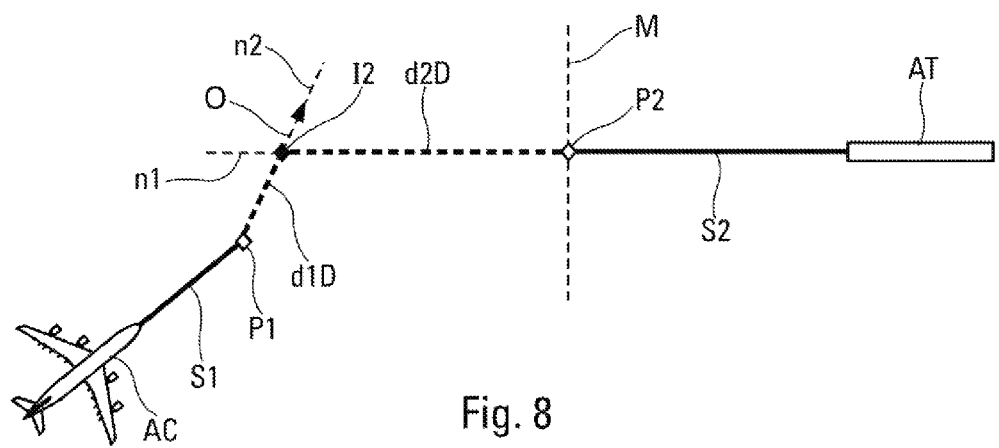
Figure 9:
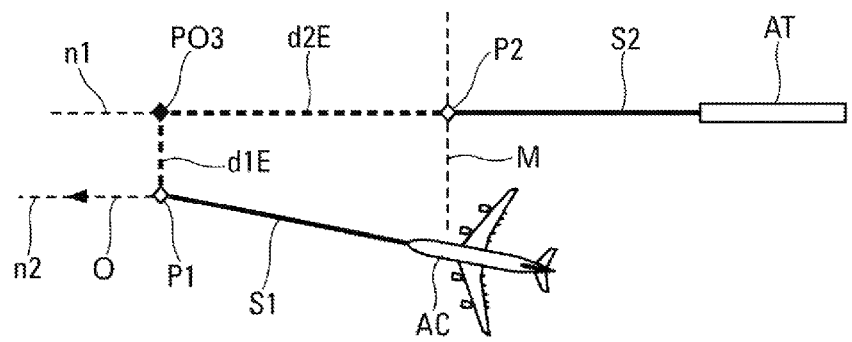
Figure 10:
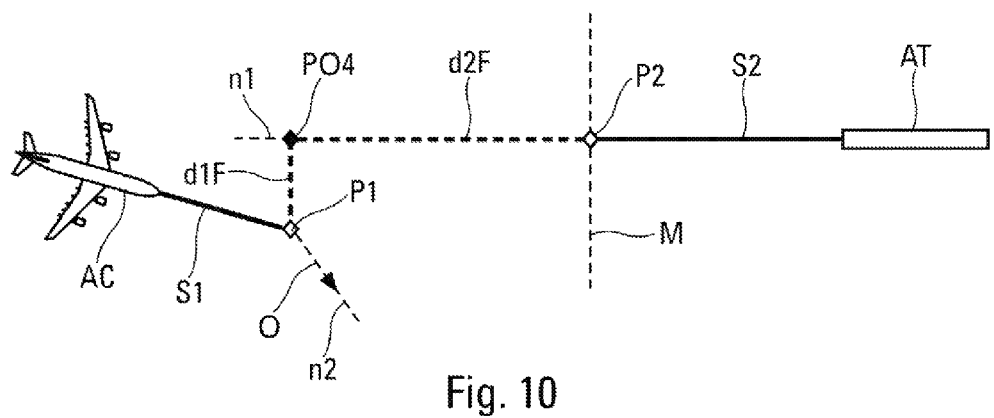

The computation unit 4 comprises a checking unit 12 to check on which side of the median plane M the start point P1 of the unspecified termination segment is situated, that is to say if it is situated in the same half-plane as the following segment S2 relative to the median plane M (condition C1, illustrated in FIGS. 5 to 7) or if it is situated in the other half-plane from that of the following segment S2 relative to the median plane M (condition C3 illustrated in FIGS. 8 to 10).

Figure 5:
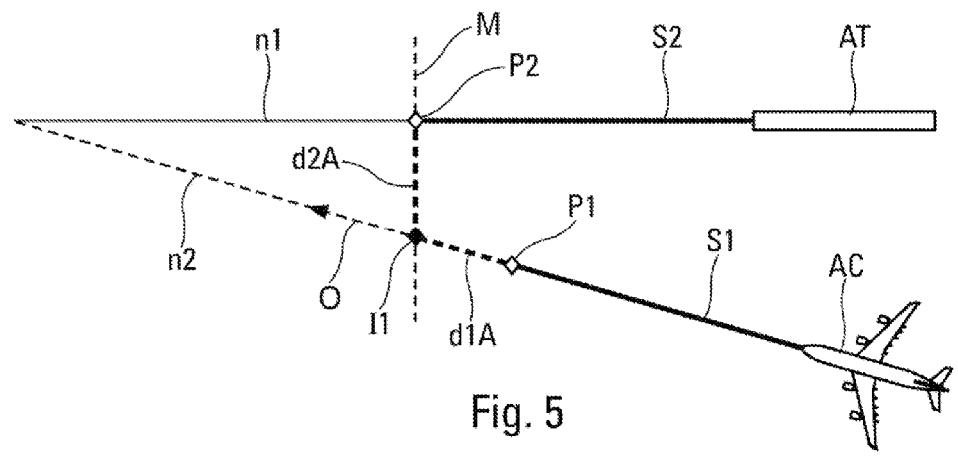
FIGS. 5 to 10 are diagrammatic views of examples of relative positionings of the geometric data shown in FIG. 4.
Figure 6:
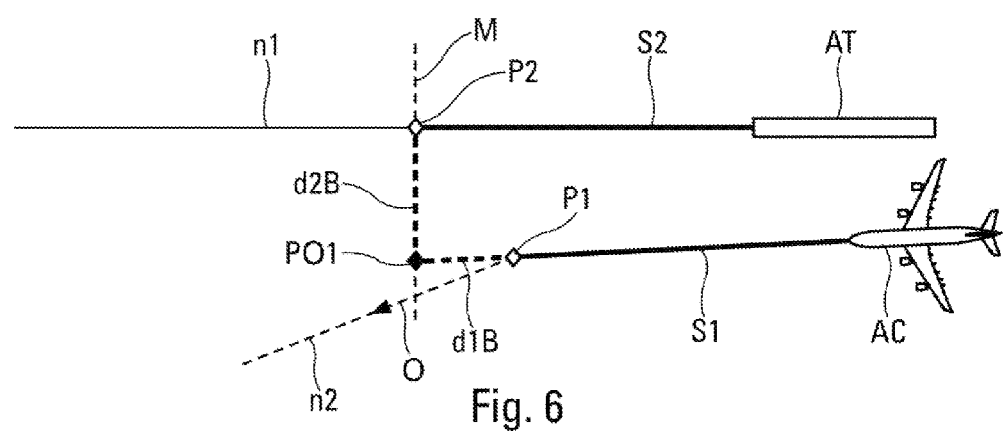

The case is where the condition C1 is met is now considered, that is to say the case illustrated in FIGS. 5 to 7, for which the start point P1 of the unspecified termination segment is situated in the same half-plane as the following segment S2 relative to the plane M.

In this case, the checking unit 12 of the computation unit 4 checks if the following condition C2 is met: the extension n2 of the unspecified termination segment intersects, on the one hand, the extension n1 of the following segment S2 and, on the other hand, the median plane M (at a point called the point of intersection I1).

In the example shown in FIG. 5, for which the condition C2 is met (in addition to the condition C1), the computation element 10 of the computation unit 4 calculates the operational distance by producing the sum of a distance d1A between the start point P1 of the unspecified termination segment and said point of intersection I1 and a second distance d2A between said point of intersection I1 and the start point P2 of the following segment S2.

In the examples shown in FIGS. 6 and 7, for which the condition C2 is not met (whereas the condition C1 is met), the computation element 10 of the computation unit 4 calculates the operational distance by producing the sum:
of a distance d1B, d1C between the start point P1 of the unspecified termination segment and the orthogonal projection PO1, PO2 of the start point P1 of the unspecified termination segment on the median plane M; and
a distance d2B, d2C between said orthogonal projection PO1, PO2 of the start point P1 of the unspecified termination segment on the median plane M and the start point P2 of the following segment S2.

The case where the condition C3 is met is now considered, that is to say the case shown in FIGS. 8 to 10, for which the start point P1 of the unspecified termination segment is not situated in the same half-plane as the following segment S2 relative to the median plane M.

In this case, the checking unit 12 of the computation unit 4 checks if the following condition C4 is met: the extension n2 of the unspecified termination segment intersects, on the one hand, the median plane M and, on the other hand, the extension n1 of the following segment S2 (at a point called the point of intersection I2).

In the example shown in FIG. 8, for which the condition C4 is met (in addition to the condition C3), the computation element 10 of the computation unit 4 calculates the operational distance by producing the sum of a first distance d1D between the start point P1 of the unspecified termination segment and said point of intersection I2 and a distance d2D between said point of intersection I2 and the start point P2 of the following segment S2.

In the examples shown in FIGS. 9 and 10, for which the condition C4 is not met (whereas the condition C3 is met), the computation element 10 of the computation unit 4 calculates the operational distance by producing the sum:

of a first distance d1E, d1F between the start point P1 of the unspecified termination segment and the orthogonal projection PO3, PO4 of the start point P1 of the unspecified termination segment on the extension n1 of the following segment S2; and a second distance d2E, d2F between said orthogonal projection PO4 of the start point P1 of the unspecified termination segment on the extension n1 of the following segment S2 and the start point P2 of the following segment S2.

Moreover, in a particular embodiment, the man/machine interface 8 of the device 1 is configured to allow a member of the crew of the aircraft to enter an operational distance called new operational distance, intended to possibly replace the calculated operational distance.

The computation unit 4 comprises a checking element 13 which checks if the following condition C5 is met: the new operational distance (entered by a member of the crew into the device 1) is greater than a direct distance between the start point P1 of the unspecified termination segment and the start point P2 of the following segment S2.

If the condition C5 is met, the computation unit 4 replaces the calculated operational distance by the new operational distance.

On the other hand, if the condition C5 is not met, the computation unit 4 rejects the proposed replacement and retains the calculated operational distance.

The man/machine interface 8 of the device 1 is also configured to allow a member of the crew of the aircraft to delete the calculated operational distance. When a member of the crew of the aircraft deletes the calculated operational distance, the computation unit 4 replaces the calculated operational distance (thus deleted) by a new operational distance. This new operational distance corresponds to a direct distance between the start point P1 of the unspecified termination segment and the start point P2 of the following segment S2.

The device 1 displays the new operational distance 8 is a way that is differentiated with respect to a display of the calculated operational distance on a screen of the display unit 6.

Figure 3:
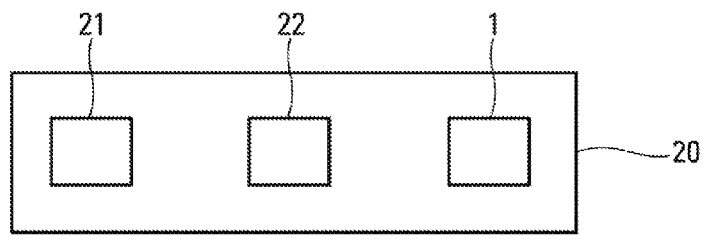
FIG. 3 is a block diagram of a flight management system comprising the device shown in FIG. 1.

In a preferred embodiment, the device 1 forms part of a flight management system 20 of the FMS (Flight Management System) type of the aircraft, as shown in FIG. 3.

The system 20 notably comprises, in a usual way, a computation unit 21 for calculating various usual parameters and notably prediction parameters (or elements). In a preferred embodiment, the computation unit 21 uses the calculated operational distance (determined by the device 1 as mentioned above), in order to calculate, in the usual way, at least one of the following parameters:

a vertical descent and approach profile; and at least one prediction along the flight plan, such as for example a distance to destination, a fuel consumption, a flight time.

Thus, these calculations and predictions are carried out more accurately, because they are closer to reality, than in the usual case where the operational distance of the unspecified termination segment is considered as being a direct distance.

The system 20 and notably the computation unit 21 take into account a new operational distance, entered by a member of the crew during a replacement of the calculated operational distance or calculated after a deletion of the calculated operational distance by a member of the crew. In this case, the computation unit 21 updates at least some of the aforesaid parameters using the new operational distance.

The system 20 also comprises a checking unit 22 which carries out a check over the different flight segments of the flight plan in order to detect the existence of an unspecified termination segment. Moreover, for each unspecified termination segment detected, the device 1 determines a corresponding operational distance in the way described above.

The invention claimed is:

1. A method for determining an operational distance of at least one unspecified termination segment of a flight plan of an aircraft, said method comprising:

a) automatically receiving, at a receiving unit in the aircraft, at least the following geometric data:

a start point of the unspecified termination segment;

an orientation of the unspecified termination segment; and a start point of a segment called following segment, the following segment being the first segment of the flight plan following the unspecified termination segment in the direction of flight along the flight plan;

b) automatically calculating, by a first computation unit in the aircraft, a median plane passing through the start point of the following segment and perpendicular to this following segment;

c) automatically calculating, by a second computation unit in the aircraft, an operational distance, called calculated operational distance, step c) including:

determining an extension of the following segment beyond the median plane;

determining an extension of the unspecified termination segment starting from the start point of the unspecified termination segment, according to said orientation of the unspecified termination segment; and calculating the operational distance as a function of the position of the extension of the unspecified termination segment relative to the extension of the following segment and to the median plane; and d) automatically providing, by a transmission unit in the aircraft, at least one user means with the calculated operational distance.

2. The method as claimed in claim 1, further comprising an additional step of checking if the following two conditions C1 and C2 are met:

C1: the start point of the unspecified termination segment is situated, relative to the median plane calculated in step b) and defining two half-planes, in the same half-plane as said following segment, and C2: the extension of the unspecified termination segment intersects the extension of the following segment, as well as the median plane, at a point of intersection;

if the two conditions C1 and C2 are met simultaneously, step c) of the method comprises calculating the operational distance as the sum of a first distance between the start point of the unspecified termination segment and said point of intersection and a second distance between said point of intersection and the start point of the following segment; and if the condition C1 is met and the condition C2 is not met, step c) comprises calculating the operational distance as being the sum of a first distance between the start point of the unspecified termination segment and the orthogonal projection of the start point of the unspecified termination segment on the median plane and a second distance between said orthogonal projection and the start point of the following segment.

3. The method as claimed in claim 1, further comprising an additional step of checking if the following two conditions C3 and C4 are met:

C3: the start point of the unspecified termination segment is situated in the half-plane other than the one in which the following segment is situated, relative to the median plane calculated in step b) and defining two half-planes, and C4: the extension of the unspecified termination segment intersects the median plane as well as the extension of the following segment at a point of intersection;

if the if two conditions C3 and C4 are simultaneously met, step c) comprises calculating the operational distance as being the sum of a first distance between the start point of the unspecified termination segment and the point of intersection and a second distance between said point of intersection and the start point of the following segment; and if the condition C3 is met and the condition C4 is not met, step c) comprises calculating the operational distance as being the sum of a first distance between the start point of the unspecified termination segment and the orthogonal projection of the start point of the unspecified termination segment on the extension of the following segment and a second distance between said orthogonal projection and the start point of the following segment.

4. The method as claimed in claim 1, further comprising subsequent to step c):

allowing a member of the crew of the aircraft to enter an operational distance called new operational distance for the purpose of a replacement;

automatically checking if the following condition C5 is met: said new operational distance is greater than a direct distance between the start point of the unspecified termination segment and the start point of the following segment;

if the condition C5 is met, the method comprises automatically replacing the calculated operational distance by said new operational distance; and if the condition C5 is not met, the method comprises automatically rejecting the proposed replacement and of retaining the calculated operational distance.

5. The method as claimed in claim 1, further comprising subsequent to step c):

allowing a member of the crew of the aircraft to delete the calculated operational distance; and replacing the calculated operational distance by a new operational distance corresponding to a direct distance between the start point of the unspecified termination segment and the start point of the following segment, when a member of the crew of the aircraft deletes the calculated operational distance.

6. The method as claimed in claim 4, further comprising displaying the new operational distance, in a way differentiated from a display of said calculated operational distance, on a screen in the cockpit of the aircraft.

7. An onboard device for determining an operational distance of at least one unspecified termination segment of a flight plan of an aircraft, said device comprising:

a receiving unit configured to receive at least the following geometric data:

a start point of the unspecified termination segment;

an orientation of the unspecified termination segment; and a start point of a segment called following segment, the following segment being the first segment of the flight plan which follows the unspecified termination segment in the direction of flight along the flight plan;

a first computation unit configured to calculate a median plane passing through the start point of the following segment and perpendicular to this following segment;

a second computation unit configured to calculate, using geometric data, an operational distance, called calculated operational distance, the second computation unit being configured for:

determining an extension of the following segment beyond the median plane;

determining an extension of the unspecified termination segment starting from the start point of the unspecified termination segment, according to said orientation of the unspecified termination segment; and calculating the operational distance as a function of the position of the extension of the unspecified termination segment relative to the extension of the following segment and to the median plane; and a transmission unit configured to supply at least one user means with the calculated operational distance.

8. A flight management system comprising a device for determining an operational distance of at least one unspecified termination segment of a flight plan, the device comprising:

a receiving unit configured to receive at least the following geometric data:

a start point of the unspecified termination segment;

an orientation of the unspecified termination segment; and a start point of a segment called following segment, the following segment being the first segment of the flight plan which follows the unspecified termination segment in the direction of flight along the flight plan;

a first computation unit configured to calculate a median plane passing through the start point of the following segment and perpendicular to this following segment;

a second computation unit configured to calculate, using geometric data, an operational distance, called calculated operational distance, the second computation unit being configured for:

determining an extension of the following segment beyond the median plane;

determining an extension of the unspecified termination segment starting from the start point of the unspecified termination segment, according to said orientation of the unspecified termination segment; and calculating the operational distance as a function of the position of the extension of the unspecified termination segment relative to the extension of the following segment and to the median plane; and a transmission unit configured to supply at least one user means with the calculated operational distance.

9. The system as claimed in claim 8, wherein said system is configured to use the calculated operational distance of the unspecified termination segment in order to calculate at least one of the following parameters:

a vertical descent and approach profile;

at least one prediction along the flight plan.

10. The system as claimed in claim 9, wherein said system is configured to take into account a new operational distance during a replacement of the operational distance of the unspecified termination segment by the new operational distance and to recalculate at least one calculation of at least one of said parameters using said new operational distance.

* * * * *